(12) United States Patent
Sedarat

(10) Patent No.: US 7,433,395 B2
(45) Date of Patent: *Oct. 7, 2008

(54) RELIABLE MULTICARRIER COMMUNICATION IN THE PRESENCE OF TIMING PHASE ERROR

(75) Inventor: Hossein Sedarat, San Jose, CA (US)

(73) Assignee: 2Wire, Inc., San Jose, CA (US)

( * ) Notice: Subject to any disclaimer, the term of this patent is extended or adjusted under 35 U.S.C. 154(b) by 741 days.

This patent is subject to a terminal disclaimer.

(21) Appl. No.: 10/773,054

(22) Filed: Feb. 4, 2004

(65) Prior Publication Data

US 2005/0169357 A1    Aug. 4, 2005

(51) Int. Cl.
    *H04B 1/38* (2006.01)
(52) U.S. Cl. .................. 375/222; 375/227; 375/346; 370/432; 370/337; 370/229; 370/345; 370/350; 455/255; 455/67.16
(58) Field of Classification Search .............. 375/222, 375/227, 130, 260, 355, 343, 346; 370/208, 370/432, 337, 229, 345, 350; 455/255, 67.16
See application file for complete search history.

(56) References Cited

U.S. PATENT DOCUMENTS

| | | | |
|---|---|---|---|
| 4,679,227 A | 7/1987 | Hughes-Hartogs | |
| 5,768,473 A | 6/1998 | Eatwell et al. | |
| 5,818,872 A * | 10/1998 | Gupta ..................... | 375/222 |
| 5,974,098 A * | 10/1999 | Tsuda ..................... | 375/340 |
| 6,006,083 A | 12/1999 | Tong et al. | |
| 6,754,170 B1 * | 6/2004 | Ward ...................... | 370/208 |
| 6,822,998 B1 * | 11/2004 | Yun et al. ................ | 375/130 |
| 6,859,488 B2 | 2/2005 | Azenkot et al. | |
| 7,200,196 B2 * | 4/2007 | Li et al. .................. | 375/355 |
| 2004/0066865 A1 | 4/2004 | Yousef et al. | |
| 2004/0156441 A1 | 8/2004 | Peeters et al. | |
| 2005/0111561 A1 * | 5/2005 | Sedarat et al. .......... | 375/260 |
| 2005/0169357 A1 | 8/2005 | Sedarat | |
| 2005/0190825 A1 | 9/2005 | Sedarat | |
| 2006/0062379 A1 | 3/2006 | Sedarat et al. | |
| 2006/0067388 A1 | 3/2006 | Sedarat | |
| 2006/0083321 A1 | 4/2006 | Sedarat | |

(Continued)

OTHER PUBLICATIONS

Peter S. Chow, et al., "A Practical Discrete Multitone Transceiver Loading Algorithm for Data Transmission over Spectrally Shaped Channels," *IEEE Trans. On Communications*, vol. 43, No. 2, pp. 773-775, 1995.

(Continued)

*Primary Examiner*—Chieh M. Fan
*Assistant Examiner*—Eva Puente
(74) *Attorney, Agent, or Firm*—Blakely, Sokoloff, Taylor & Zafman LLP

(57) ABSTRACT

A method, system and apparatus for reliable multicarrier communication in the presence of timing phase error is disclosed. Phase noise due to a sampling-time phase mismatch between a transmitter device and a receiver device is measured in a signal. A Gaussian noise power level in the signal is determined, and a gain factor associated with the phase noise is calculated. The gain factor is applied to the Gaussian noise power level to calculate an equivalent noise power. In one aspect, the equivalent noise power is used to determine a signal-to-noise ratio. In another aspect, the signal is a multicarrier signal including a plurality of sub-carriers.

26 Claims, 5 Drawing Sheets

U.S. PATENT DOCUMENTS

2006/0222098 A1 10/2006 Sedarat et al.
2006/0253515 A1 11/2006 Sedarat

OTHER PUBLICATIONS

Jorge Campello, "Optimal Discrete Bit Loading for Multicarrier Modulation Systems," *IEEE International Symposium on Information Theory*, Aug. 1998, Cambridge, MA, p. 193.
Brian S. Krongold, et al., "Computationally Efficient Optimal Power Allocation Algorithms for Multicarrier Communication Systems," *IEEE Trans. On Communications*, vol. 48, pp. 23-27, Jan. 2000.
Ranjan V. Sonalkar, "An Efficient Bit-Loading Algorithm for DMT Applications," *IEEE Comm. Letters*, vol. 4, pp. 80-82, Mar. 2000.
Ana Garcia Armada, et al., "Multi-User Constant-Energy Bit Loading for M-PSK-Modulated Orthogonal Frequency Division Multiplexing," *IEEE Wireless Communications and Networking Conference (WCNC)*, Orlando, pp. 526-530, Mar. 2002.
Andre Noll Barreto, et al., "Adaptive Bit Loading for Wireless OFDM Systems," *IEEE International Symposium on Personal, Indoor and Mobile Radio Communications, G-88 to G92*, Oct. 2001.
Enzo Baccarelli, et al., Novel Efficient Bit-Loading Algorithms for Peak-Energy-Limited ADSL-Type Multicarrier Systems, *IEEE Trans on Signal Processing*, vol. 50, No. 5, pp. 1237-1247, May 2002.
Sedarat, Hossein, et al., "Impulse Noise Protection for Multi-Carrier Communication Systems", Submitted to IEEE ICASSP (2005).
Sedarat, Hossein, et al., "Multicarrier Bit-Loading in Presence of Biased Guassian Noise Source", IEEE Consumer Communication and Networking Conference, Jan. 2005.
Fischer, Robert F.H., et al., "A New Loading Algorithm for Discrete Multitone Transmission," IEEE, 1996, pp. 724-728.
Lampe, Lutz H.-J., et al., "Performance Evaluation of Non-Coherent Transmission over Power Lines," 8 pgs.
Henkel, Werner, et al., "Maximizing the Channel Capacity of Multicarrier Transmission by Suitable Adaptation of the Time-Domain Equalizer," IEEE, vol. 48, No. 12, Dec. 2000.
Lashkarian, Navid, et al., "Fast Algorithm for Finite-Length MMSE Equalizers with Application to Discrete Multitone Systems," IEEE 1999, pp. 2753-3756.
Melsa, Peter J.W., et al., "Impulse Response Shortening for Discrete Multitone Transceivers," IEEE vol. 44, No. 12, Dec. 1996, pp. 1662-1672.
Al-Dhahir, Naofal, et al., "Optimum Finite-Length Equalization for Multicarrier Transceivers," IEEE vol. 44, No. 1, Jan. 1996, pp. 56-64.
Leke, Achankeng, et al., "A Maximum Rate Loading Algorithm for Discrete Multitone Modulation Systems," IEEE 1997, pp. 1514-1518.

Bingham, John A.C., "Mutlicarrier Modulation for Data Transmission: An Idea Whose Time Has Come," IEEE, May 1990, pp. 5-14.
Arslan, G., et al., "Equalization for Discrete Multitone Transceivers to Maximize Bit Rate," IEEE, vol. 49, No. 12, Dec. 2001, pp. 3123-3135.
Farhang-Boroujeny, Behrouz, et al., "Design Methods for Time-Domain Equalizers in DMT Transceivers," IEEE, vol. 49, No. 3, Mar. 2001, pp. 554-562.
Wyglinski, Alexander M., et al., "An Efficient Bit Allocation for Multicarrier Modulation," IEEE Wireless Communication, Networking Conference, Atlanta, GA, Mar. 2004, 6 pgs.
"Draft Standard," Network and Customer Installation Interfaces—Asymmetric Digital Subscriber Line (ADSL) Metallic Interface, Draft American National Standard for Telecommunication, Alliance for Telecommunications Industry Solutions, T1.413-1998.
Milosevic et al., "Simultaneous Multichannel Time Domain Equalizer Design Based on the Maximum Composite Shortening SNR", Dept. of Electrical and Computer Eng., The University of Texas, Austin, Texas, Prior to filing date of current application, pp. 5 total.
Fukuda, Misao et al., "A Line Terminating LSI Using Echo Cancelling Method for ISDN Subscriber Loop Transmission", IEEE Journal on Selected Areas in Communications, vol. 6, No. 3, Apr. 1988, pp. 476-483.
Wu, Cheng-Shing et al., "A Novel Cost-Effective Multi-Path Adaptive Interpolated FIR (IFIR)-Based Echo Canceller", © 2000 IEEE, pp. V-453-V-456.
Sonalkar, Ranjan V. et al., "Shannon Capacity of Frequency-Overlapped Digital Subscriber Loop Channels", © 2002 IEEE, pp. 1741-1745.
Perez-Alvarez, Ivan A. et al., "A Differential Error Reference Adaptive Echo Canceller for Multilevel PAM Line Codes*" *Work supported by National Project T1C95-0026, © 1996, IEEE, pp. 1707-1710.
Ahmed, Nadeem et al., "Optimal Transmit Spectra for Communication in the Presence of Crosstalk and Imperfect Echo Cancellation", Copyright 2001 IEEE, pp. 17-21.
Franklin, Curt, "How'DSL Works", How Stuff Works, http://computer.howstuffworks.com/dsl..htm/printable, printed Nov. 16, 2004, pp. 1-6.
U.S. Appl. No. 10/789,552, Office Action dated Apr. 9, 2007, 10 pages.
U.S. Appl. No. 10/721,445, Office Action dated Jan. 26, 2007, 8 pages.
U.S. Appl. No. 10/721,445, Office Action dated Jul. 26, 2007, 8 pages.
U.S. Appl. No. 10/789,552, Office Action dated Oct. 17, 2007, 13 pages.

* cited by examiner

RELIABLE MULTICARRIER COMMUNICATION IN THE PRESENCE OF TIMING PHASE ERROR

TECHNICAL FIELD

This disclosure relates generally to communication systems, and more particularly to multicarrier communication in the presence of timing phase error.

BACKGROUND

A Discrete Multi-Tone (DMT) communication system carries information from a transmitter to a receiver over a number of tones. The tones are also commonly referred to as sub-carriers or sub-channels. There are various sources of interference and noise in a DMT system that may corrupt the information signal on each tone as it travels through the communication channel and is decoded at the receiver. Because of this signal corruption, the transmitted data may be retrieved erroneously by the receiver. In order to ensure a reliable communication between transmitter and receiver, each tone may carry a limited number of data bits. The number of data bits or the amount of information that a tone carries may vary from tone to tone and depends on the relative power of the information and the corrupting signals on that particular tone.

A reliable communication system is typically defined as a system in which the probability of an erroneously detected data bit by the receiver is always less than a target value. The aggregate sources of corruption associated with each tone are commonly modeled as a single additive noise source with Gaussian distribution that is added to the information signal on that tone. Under these assumptions, the signal-to-noise power ratio (SNR) becomes a significant factor in determining the maximum number of data bits a tone can carry reliably.

The direct relationship between SNR and the bit rate is based on the key assumption of Gaussian distribution for noise. However, this assumption may not be completely valid in many practical situations. An important source of non-Gaussian impairment is, for example, phase noise. Phase noise may be a sampling-time phase mismatch between the transmitter and the receiver devices. This type of error may result from for example, phase jitter of the sampling oscillator on the transmitter side or poor phase lock on the receiver side. With such noise sources potentially present, a determination of the SNR may not accurately determine the reliable bit rate.

DETAILED DESCRIPTION

In the following detailed description of embodiments of the invention, reference is made to the accompanying drawings in which like references indicate similar elements, and in which, by way of illustration, specific embodiments in which the invention may be practiced are shown. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
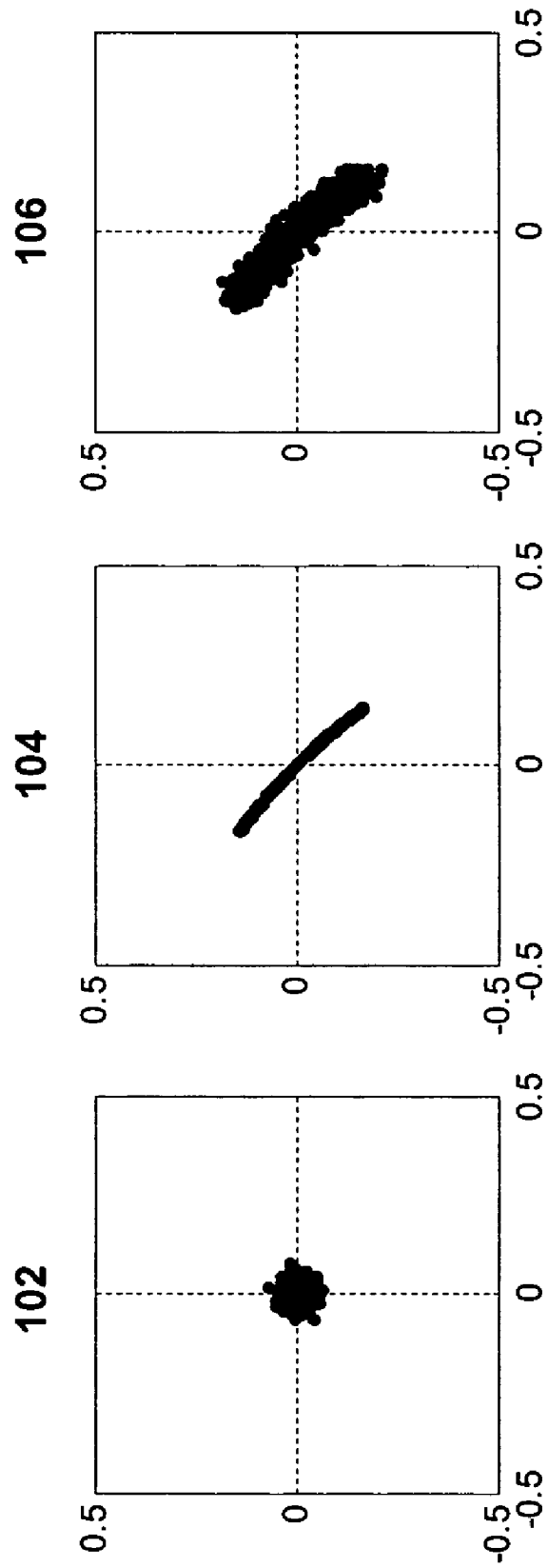
FIG. 1 illustrates examples of error scatter plots for signals having a Gaussian noise source, a timing phase error source, and both sources.

In an Asymmetric Digital Subscriber Line (ADSL) system, where each tone is modulated using a Quadrature Amplitude Modulation (QAM) scheme, the error between the receive and transmit signal is usually depicted in a 2D scatter plot for each tone. In such a plot, each point corresponds to a data point and represents the amplitude error of the in-phase and perpendicular components of the carrier. FIG. 1 illustrates examples of such scatter plots 102, 104, 106. Plot 102 illustrates a scatter plot of the error signal when the sole source of error is a Gaussian noise source. In contrast, the error from timing mismatch has a more complex characteristic, as illustrated in plot 104.

As discussed above, a timing phase error (i.e. phase noise) may result from, for example, phase jitter of the sampling oscillator on the transmitter side or poor phase lock on the receiver side. Ideally, the sampling times of the transmitter and receiver should be synchronized. The timing is typically set by either the transmitter or the receiver. Circuitry and algorithms are used to determine the timing. Timing mismatch is a multiplicative source of error, which effectively rotates the signal points on the QAM constellation. The angle of rotation can vary through time, and is usually modeled as a uniformly distributed random process. Because of the multiplicative nature of timing mismatch, the error term is proportionally larger for constellation points that are farther away from the origin. Plot 104 illustrates the effect of timing mismatch on a signal constellation point in an error scatter plot. Plot 106 illustrates an example of a scatter plot in the presence of both timing error and Gaussian noise.

Figure 2:
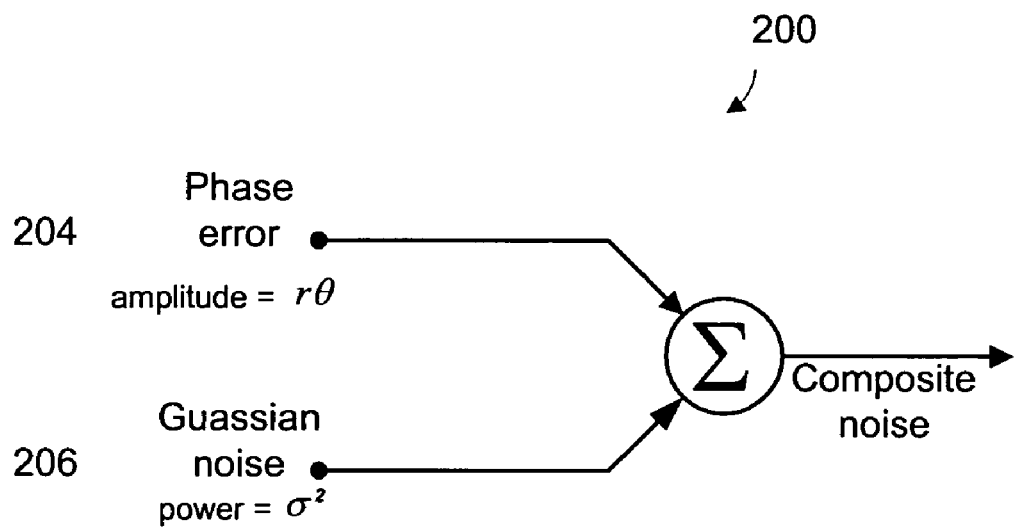
FIG. 2 illustrates an embodiment of a composite noise model consisting of Gaussian noise sources and an additive phase error source.

However, a simple Gaussian distribution may not accurately model the effects of timing phase error. Specifically, using a simple power measurement for SNR calculation underestimates the effect of phase noise and results in a higher bit-error rate. In one embodiment, a more accurate model for timing phase error takes into account the dependency of phase error to the power level of a signal or the distance of the constellation point from the origin. FIG. 2 illustrates an embodiment of a composite noise model 200 consisting of timing phase error 204 and Gaussian 206 noise sources. The amplitude of phase error is $r\theta$, where r is the distance of the constellation point from the origin and $\theta$ is the measured phase error for the corresponding sub-channel. Unlike a simple Gaussian noise model, the parameters of this composite model 200 vary with the frequency of a sub-channel and also with the distance of signal points in a constellation. However, it may be noted that the value of timing phase error varies linearly with frequency. Therefore, with phase error measurement in one sub-channel, the values of phase error in other sub-channels may be derived. For example, in one embodiment, a pilot tone at sub-carrier 64, at frequency 276 kHz, in a DMT system is used to measure a timing phase error. The pilot tone typically has a good signal to noise ratio, which allows for derivation of the timing from this tone with a high degree of certainty. It will be appreciated that other techniques of deriving the timing information may be employed with embodiments of the present invention. Embodiments of the present invention described below present a method to analyze the bit-error rate with this type of composite noise source.

Equivalent Noise Power

A bit-error occurs when the noise amplitude is large enough so that a received QAM constellation point crosses the so-called decision boundary and is decoded as a neighboring point. The decision boundaries normally cross midway between the adjacent constellation points. For a Gaussian noise source, the ratio of the minimum-distance of constellation points to the power level of noise determines the bit-error rate. For a fixed power level of noise, the higher the minimum distance is, the lower the probability of error is. When maintaining a target error rate for a given power level of noise, the constellation size may be chosen such that its minimum-distance is above:

$$d_G = \alpha \sigma \quad (1),$$

where $d_G$ denotes the minimum-distance when the noise source is purely Gaussian, $\sigma^2$ is the power of the Gaussian noise source, and $\alpha$ is a constant factor that depends significantly on the error rate and the channel coding scheme. For example, in one embodiment, for an uncoded modulation with a target bit-error rate of $10^{-7}$, $\alpha$ has a value of about 6.0.

In one embodiment, to obtain a similar expression for phase noise, an assumption is made that the probability of error is mostly dominated by constellation points with largest phase noise. These points are the ones that are positioned farthest from the center of constellation. In one embodiment, using this assumption and for the sake of bit-error rate analysis, the power of phase noise is decoupled from the power of the signal. In other words, the parameters of the composite noise model 200 of FIG. 2 will become independent of the signal by using the distance of the farthest point of the constellation for r. Using this rationale, in one embodiment, the maximum value of phase error θ is used over the entire noise measurement interval.

In one embodiment, with these assumptions, the phase noise adds a constant non-zero bias of $\beta = r_{max} \theta_{max}$ to the Gaussian noise source, which shifts the Gaussian scatter plot off-center and closer to the decision boundaries. The effective minimum distance is smaller than the nominal by twice the value of bias. Therefore, in one embodiment, to maintain a target error rate with timing phase noise, the minimum-distance should be set to:

$$d_P = \alpha \sigma + 2\beta \quad (2).$$

In one embodiment, it is useful to find an equivalent pure Gaussian noise source that results in the same minimum-distance as a composite noise source. In one embodiment, using equations (1) and (2), the power of the equivalent noise source, $\sigma_e$, is derived as:

$$\sigma_e = \sigma \left(1 + \frac{2}{\alpha} \frac{\beta}{\sigma}\right). \quad (3)$$

Figure 3:
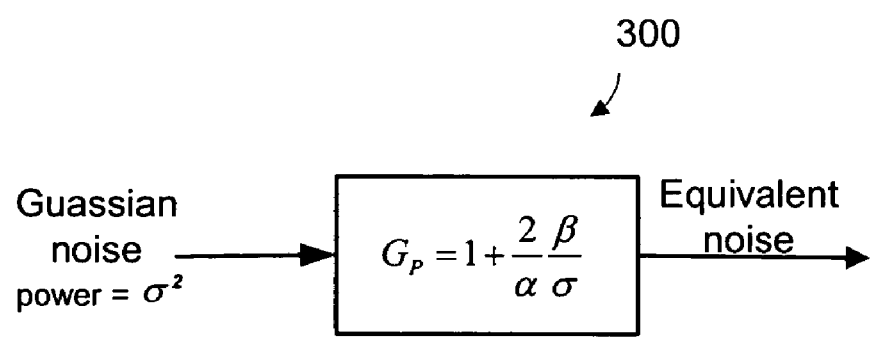
FIG. 3 illustrates an embodiment of an equivalent noise model of a composite noise source.

This indicates that for the purpose of bit-error rate analysis and bit-loading, a composite noise source is equivalent to a simple Gaussian noise source with an amplified power. Therefore, in one embodiment, the composite noise model 200 of FIG. 2 can be simplified as an equivalent Gaussian noise source illustrated FIG. 3. FIG. 3 illustrates an equivalent noise model 300 in which the phase noise effectively acts as an amplifier for the original Gaussian noise source with an equivalent gain, $G_P$, of:

$$G_P = 1 + \frac{2}{\alpha} \frac{\beta}{\sigma}. \quad (4)$$

It should be noted that the assumptions that led to the equivalent noise model 300 and the corresponding effective gain $G_P$ for phase noise may only hold when the phase noise is large enough. When a timing phase error is small, the Gaussian noise is the dominant noise source and a simple Gaussian model is applicable. For example, in one embodiment, where a timing phase error for a particular tone (expressed in Radian) is about one-tenth of $\sqrt{SNR}$ for that tone, a Gaussian model is applicable.

Noise Power Measurement in ADSL

Figure 4:
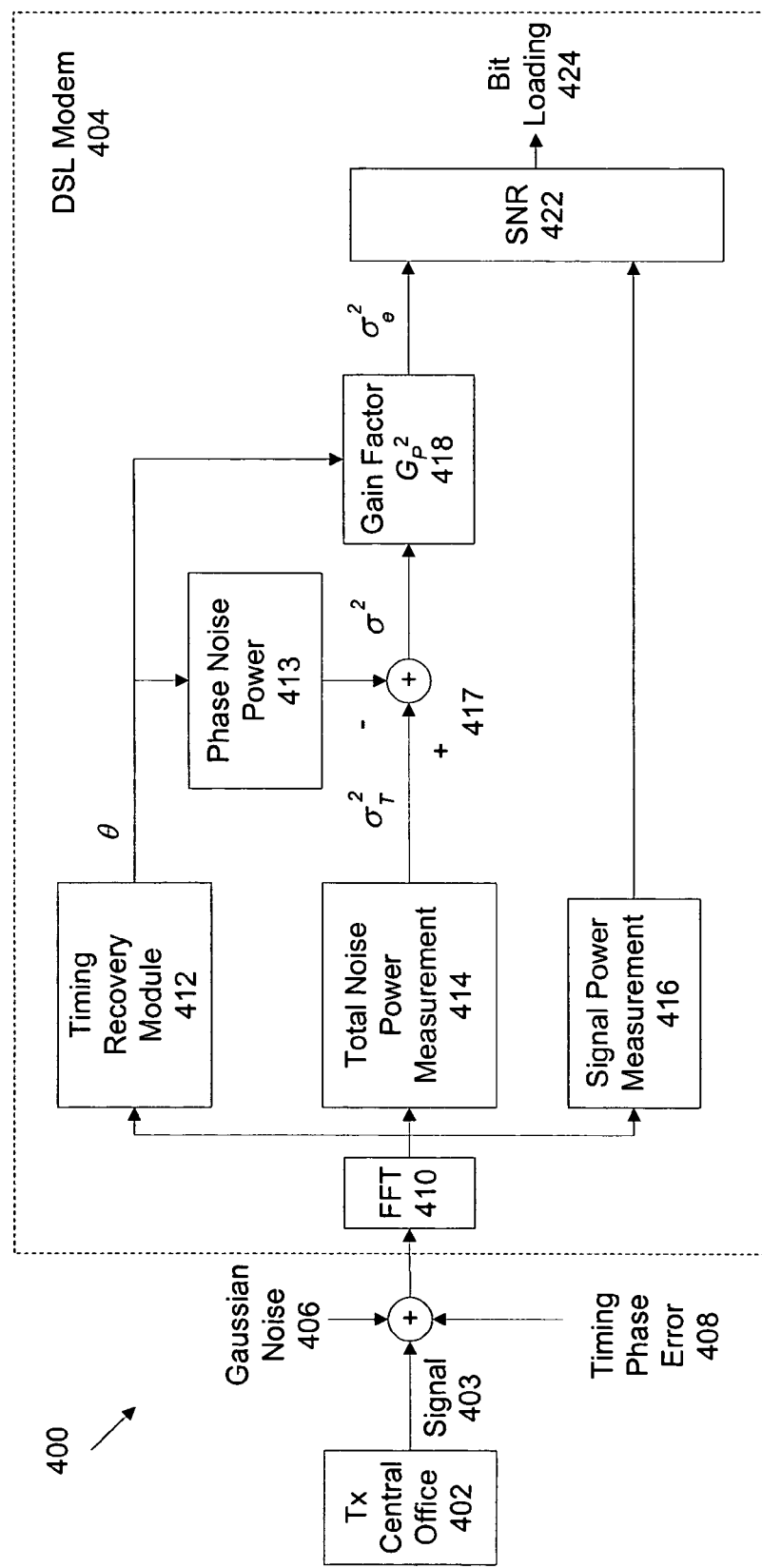
FIG. 4 illustrates an embodiment of a Discrete Multi-Tone communication system.

A system level overview of the operation of an embodiment of the invention is described with reference to FIG. 4. FIG. 4 illustrates an embodiment of a DMT communication system 400. A transmitter 402 at a central office transmits a multicarrier signal 403 (e.g. a DMT signal) to a receiver DSL modem 404. As the signal 403 travels to the modem 404 through a transmission channel (e.g. a telephone line), the signal is potentially corrupted by Gaussian noise sources 406. In addition, the signal may contain timing phase errors 408. Once the signal 403 is received at the modem 404, a Fast Fourier Transform (FFT) block 410 transforms samples of the signal from the time-domain to the frequency-domain, such that a stream of data for each sub-carrier may be output. In one embodiment, processing of each sub-carrier may be performed in parallel or in series.

For a particular sub-carrier of the multicarrier signal, a Total Noise Power Measurement block 414 measures the power level of total noise, $\sigma_r^2$, for the sub-carrier. A Timing Recovery Module (TRM) 412 attempts to synchronize the transmit and receive timing. The TRM adjusts the sampling frequency to drive the phase error toward zero. In one embodiment, the TRM 412 measures a timing phase error θ in the sub-carrier signal.

A Phase Noise Power block 413 calculates the average phase noise power, $\overline{\theta^2}$ of the timing phase errors measured by the TRM 412. The phase error power for the particular sub-carrier is subtracted 417 from the total noise power level $\sigma_T^2$ to obtain the Gaussian noise power level $\sigma^2$. In one embodiment, Gain Factor block 418 subtracts the phase error power for the particular sub-carrier from the total noise power level to obtain the Gaussian noise power level. In another embodiment, Total Noise Power Measurement block 414 subtracts the phase error power for the particular sub-carrier from the total noise power level to obtain the Gaussian noise power level.

Gain Factor block 418 determines a Gain Factor $G_P$ associated with the timing phase error. In one embodiment, the Gain Factor is calculated from the maximum timing phase error $\theta_{max}$ and the Gaussian noise power $\sigma^2$. In one embodiment, the Gain Factor $G_P^2$ is applied to the Gaussian noise power $\sigma^2$ for the sub-carrier to obtain an equivalent noise power $\sigma_e^2$. The equivalent noise power is input into a Signal-to-Noise Ratio (SNR) block 422.

A Signal Power Measurement block 416 measures the signal power for the sub-carrier, and inputs the result into the SNR block 422. The SNR block determines a signal-to-noise ratio, which is used to determine bit loading 424 for the sub-carrier. The particular methods used in the system 400 are described below with respect to a flow chart.

Figure 5:
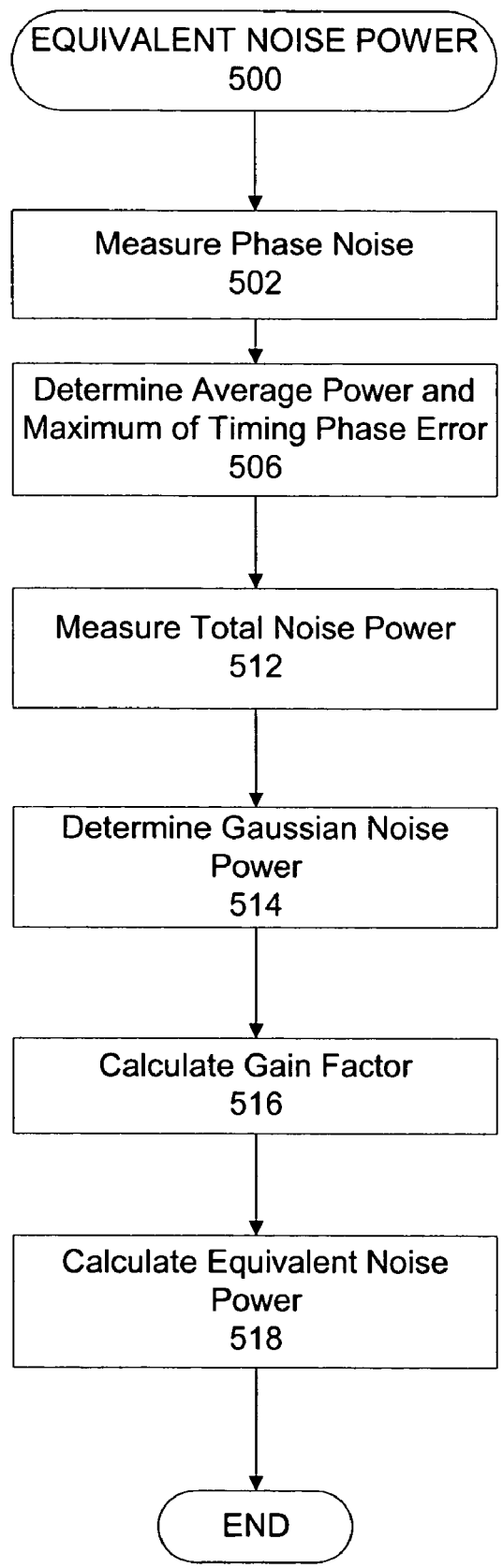
FIG. 5 illustrates an embodiment of an equivalent noise power method.

In one embodiment, the present invention provides for the automatic calculation of an equivalent noise power in a DMT communication system in the presence of timing phase error. FIG. 5 illustrates an embodiment of an equivalent noise power method 500, which may be implemented in the system 400 illustrated in FIG. 4.

The method 500 illustrated in FIG. 5 constitutes a computer program made up of computer-executable instructions illustrated as blocks (acts) from 500 until 518. Describing the method by reference to a flow chart enables one skilled in the art to develop such programs including such instructions to carry out the methods on suitably configured computers (the processor of the computer executing the instructions from computer-readable media, including memory). The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic ...), as taking an action or causing a result. Such expressions are merely a shorthand way of saying that execution of the software by a computer causes the processor of the computer to perform an action or produce a result. It will be appreciated that more or fewer processes may be incorporated into the method illustrated in FIG. 5 without departing from the scope of the invention and that no particular order is implied by the arrangement of blocks shown and described herein. For example, in one embodiment, processes represented by blocks may be performed in parallel.

In one embodiment of the method 500, a timing phase error is measured based on data from the signal. In one embodiment, based on the timing phase error measurement, the method 500 calculates the effective gain and equivalent noise source for each sub-carrier independently. In another embodiment, the method 500 calculates a single gain factor to be applied to all sub-carriers of the signal. In one embodiment, processing of each sub-carrier may be performed in parallel or in series.

In one embodiment, at block 502, the method 500 measures a timing phase error (i.e. phase noise) in a sub-carrier. The average power of the timing phase error and the maximum phase error is determined by the method 500 at block 506. In one embodiment, the timing phase error, $\theta_i$, is measured over a finite time interval of n samples for each sub-carrier. In another embodiment, the error samples, $e_i$, are also measured over the same time interval. The measurement is updated regularly after a new set of error samples are collected. In one embodiment, these measurements are obtained for a single sub-carrier, $f_P$, from a phase-lock loop (PLL), a timing recovery module, or other resources for timing synchronization. In one embodiment, at block 506 the method 500 calculates the average power, $\overline{\theta^2}$, of the timing phase error and the maximum error, $\theta_{max}$, of the timing phase error as:

$$\overline{\theta^2} = \frac{1}{n}\sum_{i=1}^{n}\theta_i^2, \tag{5}$$

$$\theta_{max} = \text{MAX}(|\theta_i|), \tag{6}$$

where n is a number of samples measured. In one embodiment, the average power of the timing phase error (5) and the maximum error of the timing phase error (6) is determined for a phase noise measurement sub-carrier. In another embodiment, the average power of the timing phase error and the maximum error of the timing phase error is determined for each sub-carrier.

In one embodiment, the method 500 performs the acts represented by blocks 506 to 518 for each sub-carrier of the signal. In one embodiment, at block 512, the method 500 measures the total noise power, $\sigma_T^2$, of the error samples based on the average power of the error samples, where $\sigma_T^2$ is calculated as:

$$\sigma_T^2 = \frac{1}{n}\sum_{i=1}^{n}e_i^2, \tag{7}$$

where n is a number of samples measured. This quantity includes both the power of Gaussian noise and also phase error. At block 514, the method determines the Gaussian noise power $\sigma^2$. In one embodiment, the Gaussian noise power $\sigma^2$ is determined as:

$$\sigma^2 = \sigma_T^2 - \overline{\theta^2}\frac{f^2}{f_P^2}\overline{r^2}, \tag{8}$$

where f is the sub-carrier frequency, $\overline{r^2}$ is the average signal power for that sub-carrier, and $f_P$ is the frequency of the phase error measurement sub-carrier. In one embodiment, $f_P$ is the pilot tone at 276 kHz in an ADSL communication system.

At block 516, the method 500 calculates the Gain Factor, $G_P$, associated with the phase noise. In one embodiment, the method 500 calculates the Gain Factor, $G_P$, as:

$$G_P = 1 + \frac{2}{\alpha\sigma}r_{max}\frac{f}{f_P}\theta_{max}. \tag{9}$$

At block 518, the method 500 calculates the equivalent noise power for the particular sub-carrier by applying the Gain Factor, $G_P^2$, to the power of the Gaussian noise source measured by the method 500 at block 514. In one embodiment, the power of the equivalent noise source, $\sigma_e^2$, for the particular sub-carrier is calculated as:

$$\sigma_e^2 = \sigma^2 G_P^2 \tag{10}.$$

The final value of equivalent noise power, $\sigma_e^2$, can be used in any bit-loading algorithm that is designed specifically for Gaussian noise sources. For example, in one embodiment, the equivalent noise power calculated by the method 500 is used to determine the SNR for the sub-carrier. Subsequently, the SNR based on the equivalent noise power is used to determine a bit-loading for the sub-carrier in the presence of timing phase error. The resulting bit-error rate remains at target value even if the noise source is not purely Gaussian and consists of a timing phase error (i.e. phase noise). In another embodiment, the equivalent noise power is used to determine or analyze the bit-error rate of the signal.

In one embodiment, the method 500 is implemented more robustly by introducing hysteresis based on the calculated Gain Factor value. The result is an improved user experience, since fluctuation between phase noise compensation and non-compensation is minimized. By way of example, consider an embodiment of the present invention which is in a state in which the Gain Factor has a value of unity, e.g. $G_P=1$; in other words, phase noise compensation is inactive. In one embodiment, a threshold value of about $G_P=1.1$ is used to activate phase noise compensation for the signal. In other words, until a Gain Factor is calculated as having a value of about 1.1 or greater, the Gain Factor used in calculating the equivalent noise power will remain at a value of unity, e.g. $G_P=1$. However, in one embodiment, once the Gain Factor is calculated to have a value of about $G_P=1.1$ or greater, phase noise compensation is activated, and the actual calculated Gain Factor value is used to calculate the equivalent noise power. In another embodiment, once in a phase noise compensation state, a lower threshold is used for deactivation of phase noise compensation. For example, in one embodiment, where phase noise compensation is active (e.g. $G_P>1$), the compensation is deactivated (e.g. $G_P$ is assigned a value of unity) only when the determined Gain Factor has a value of about $G_P \leq 1.05$.

Thus, in one embodiment, from a state in which the Gain Factor has a value of unity, a first threshold is used to control when phase noise compensation is activated. Once activated, a second threshold which is lower than the first threshold, is used to control when the phase noise compensation is deactivated. It will be appreciated that other values may be used as thresholds for hysteresis, and that other measurements may be used to control activation and deactivation of phase noise compensation.

Although embodiments of the present invention are described primarily with respect to the measurement and compensation for timing phase error (i.e. phase noise), it will be appreciated that embodiments of the present invention may be applied to compensate for other types of non-Gaussian noise sources. For example, impulse noise, a type of non-Gaussian noise, may be compensated for by determining a gain factor associated with the impulse noise, and applying the gain factor to determine an equivalent noise power.

Furthermore, although embodiments of the present invention are described primarily with respect to ADSL systems using DMT modulation, it will be appreciated that embodiments of the present invention are not limited thereto. For example, embodiments of the present invention are applicable to other types of DSL systems, such as, but not limited to, Rate Adaptive DSL (RADSL), Very High Bit Rate DSL (VDSL or VHDSL), High Bit Rate DSL (HDSL), Symmetric DSL (SDSL), ISDN DSL (IDSL), and Orthogonal Frequency Division Multiplexing (OFDM), as well as communications systems using other modulation techniques. Embodiments of the present invention are applicable to communication systems employing carrier signals in general. For example, in a single carrier system, timing phase error may be measured and compensated for by modeling the timing phase error as described above, and generating a gain factor associated with the timing phase error.

Figure 6:
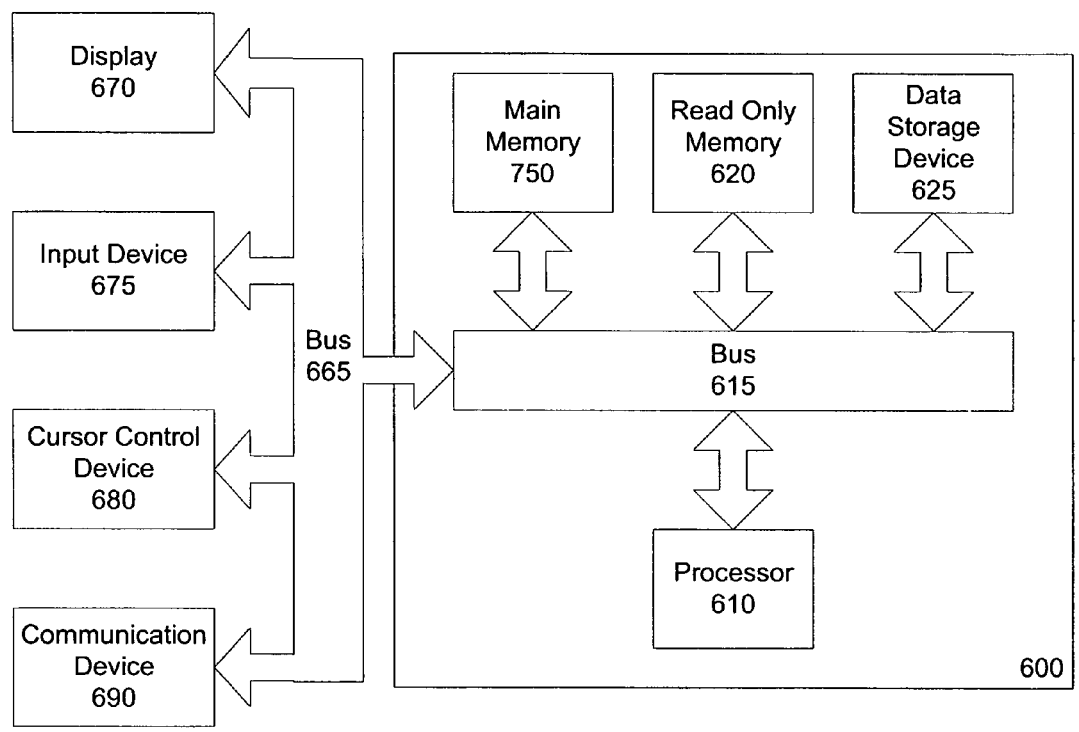
FIG. 6 illustrates an embodiment of a computer system suitable for use in practicing the present invention.

FIG. 6 is one embodiment of a computer system that may be used with embodiments of the present invention. It will be apparent to those of ordinary skill in the art, however that other alternative systems of various system architectures may also be used.

The data processing system illustrated in FIG. 6 includes a bus or other internal communication means 615 for communicating information, and a processor 610 coupled to the bus 615 for processing information. The system further comprises a random access memory (RAM) or other volatile storage device 650 (referred to as memory), coupled to bus 615 for storing information and instructions to be executed by processor 610. Main memory 650 also may be used for storing temporary variables or other intermediate information during execution of instructions by processor 610. The system also comprises a read only memory (ROM) and/or static storage device 620 coupled to bus 615 for storing static information and instructions for processor 610, and a data storage device 625 such as a magnetic disk or optical disk and its corresponding disk drive. Data storage device 625 is coupled to bus 615 for storing information and instructions.

The system may further be coupled to a display device 670, such as a cathode ray tube (CRT) or a liquid crystal display (LCD) coupled to bus 615 through bus 665 for displaying information to a computer user. An alphanumeric input device 675, including alphanumeric and other keys, may also be coupled to bus 615 through bus 665 for communicating information and command selections to processor 610. An additional user input device is cursor control device 680, such as a mouse, a trackball, stylus, or cursor direction keys coupled to bus 615 through bus 665 for communicating direction information and command selections to processor 610, and for controlling cursor movement on display device 670.

Another device, which may optionally be coupled to computer system 600, is a communication device 690 for accessing other nodes of a distributed system via a network. The communication device 690 may include any of a number of commercially available networking peripheral devices such as those used for coupling to an Ethernet, token ring, Internet, or wide area network. The communication device 690 may further be a null-modem connection, a wireless connection mechanism, or any other mechanism that provides connectivity between the computer system 600 and the outside world. Note that any or all of the components of this system illustrated in FIG. 6 and associated hardware may be used in various embodiments of the present invention.

It will be appreciated by those of ordinary skill in the art that any configuration of the system may be used for various purposes according to the particular implementation. The control logic or software implementing the present invention can be stored in main memory 650, mass storage device 625, or any machine-readable medium locally or remotely accessible to processor 610. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, and flash memory devices.

It will be apparent to those of ordinary skill in the art that the system, method, and process described herein can be implemented as software stored in main memory 650 or read only memory 620 and executed by processor 610. This control logic or software may also be resident on an article of manufacture comprising a computer readable medium having computer readable program code embodied therein and being readable by the mass storage device 625 and for causing the processor 610 to operate in accordance with the methods and teachings herein.

The present invention may also be embodied in a handheld or portable device containing a subset of the computer hardware components described above. For example, the handheld device may be configured to contain only the bus 615, the processor 610, and memory 650 and/or 625. The present invention may also be embodied in a special purpose appliance including a subset of the computer hardware components described above. For example, the appliance may include a processor 610, a data storage device 625, a bus 615, and memory 650, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The above description of illustrated embodiments of the invention, including what is described in the Abstract, is not intended to be exhaustive or to limit the invention to the precise forms or embodiments disclosed. While specific embodiments of, and examples for, the invention are described herein for illustrative purposes, various equivalent modifications are possible within the scope of the invention, as those skilled in the relevant art will recognize. These modifications can be made to embodiments of the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising:
    measuring phase noise in a signal, the phase noise due to a sampling-time phase mismatch between a transmitter device and a receiver device, wherein said signal is a multicarrier signal including a plurality of sub-carriers;
    determining a Gaussian noise power level in the signal, wherein determining the Gaussian noise power level in the signal comprises:
        determining a total noise power level in the signal;
        determining a phase noise power level in the signal; and
        subtracting the phase noise power level from the total noise power level to determine the Gaussian noise power level in the signal;
    calculating a gain factor associated with the phase noise; and
    applying the gain factor to the Gaussian noise power level to calculate an equivalent noise power.

2. The method of claim 1, wherein the phase noise power level of a first sub-carrier is based on an average power of a timing phase error in a phase error measurement sub-carrier and a ratio of a frequency of the first sub-carrier and a frequency of the phase error measurement sub-carrier.

3. The method of claim 2, wherein the phase error measurement sub-carrier is a pilot-tone.

4. The method of claim 2, wherein the phase noise power level of the first sub-carrier is calculated as $$\overline{\theta^2}\frac{f^2}{f_p^2}\overline{r^2},$$

where $\overline{\theta^2}$ is the average power of the timing phase error in the phase error measurement sub-carrier, f is a frequency of the first sub-carrier, $f_p$ is a frequency of the phase error measurement sub-carrier, and $\overline{r^2}$ is the average signal power of the first sub-carrier.

5. The method of claim 4, wherein the gain factor, $G_P$, is calculated as $$G_P = 1 + \frac{2}{\alpha\sigma}r_{max}\frac{f}{f_p}\theta_{max},$$

where $\alpha$ is a constant factor based on an error rate and a sub-carrier coding scheme, $\sigma^2$ is the Gaussian noise power level of the signal, $r_{max}$ is a maximum distance of an error constellation point from an origin, and $\theta_{max}$ is a maximum phase error.

6. The method of claim 5, wherein the equivalent noise power, $\sigma_e^2$, for the first sub-carrier is calculated as $$\sigma_e^2 = \sigma^2 G_P^2.$$

7. A method comprising:
    measuring phase noise in a signal, the phase noise due to a sampling-time phase mismatch between a transmitter device and a receiver device;
    determining a Gaussian noise power level in the signal;
    calculating a gain factor associated with the phase noise;
    activating phase noise compensation based on whether the gain factor is above a first threshold;
    deactivating phase noise compensation based on whether the gain factor is below a second threshold; and
    applying a gain factor to the Gaussian noise power level to calculate an equivalent noise power when phase noise compensation is activated.

8. A computer readable medium storing executable instructions, which when executed, to cause a device to perform operations comprising:
    measuring phase noise in a signal, the phase noise due to a sampling-time phase mismatch between a transmitter device and a receiver device, wherein said signal is a multicarrier signal including a plurality of sub-carriers;
    calculating a gain factor associated with the phase noise;
    applying the gain factor to the Gaussian noise power level to calculate an equivalent noise power;
    determining a Gaussian noise power level in the signal, wherein determining the Gaussian noise power level in the signal comprises:
        determining a total noise power level in the signal;
        determining a phase noise power level in the signal; and
        subtracting the phase noise power level from the total noise power level to determine the Gaussian noise power level in the signal.

9. The computer readable medium of claim 8, wherein the phase noise power level of a first sub-carrier is based on an average power of a timing phase error in a phase error measurement sub-carrier and a ratio of a frequency of the first sub-carrier and a frequency of the phase error measurement sub-carrier.

10. The computer readable medium of claim 9, wherein the phase error measurement sub-carrier is a pilot-tone.

11. The computer readable medium of claim 9, wherein the phase noise power level of the first sub-carrier is calculated as $$\overline{\theta^2} \frac{f^2}{f_p^2} \overline{r^2},$$

where $\overline{\theta^2}$ is the average power of the timing phase error in the phase error measurement sub-carrier, f is a frequency of the first sub-carrier, $f_P$ is a frequency of the phase error measurement sub-carrier, and $\overline{r^2}$ is the average signal power of the first sub-carrier.

12. The computer readable medium of claim 11, wherein the gain factor, $G_P$, is calculated as $$G_P = 1 + \frac{2}{\alpha \sigma} r_{\max} \frac{f}{f_p} \theta_{\max},$$

where $\alpha$ is a constant factor based on an error rate and a sub-carrier coding scheme, $\sigma^2$ is the Gaussian noise power level of the signal, $r_{max}$ is a maximum distance of an error constellation point from an origin, and $\theta_{max}$ is a maximum phase error.

13. The computer readable medium of claim 12, wherein the equivalent noise power, $\sigma_e^2$, for the first sub-carrier is calculated as $$\sigma_e^2 = \sigma^2 G_P^2.$$

14. The computer readable medium storing executable instructions, which when executed, to cause a device to perform operations comprising:
  measuring phase noise in a signal, the phase noise due to a sampling-time phase mismatch between a transmitter device and a receiver device;
  determining a Gaussian noise power level in the signal;
  calculating a gain factor associated with the phase noise;
  activating phase noise compensation based on whether the gain factor is above a first threshold;
  deactivating phase noise compensation based on whether the gain factor is below a second threshold; and
  applying the gain factor to the Gaussian noise power level to calculate an equivalent noise power when phase noise compensation is activated.

15. An apparatus comprising:
  means for measuring phase noise in a signal, the phase noise due to a sampling-time phase mismatch between a transmitter device and a receiver device, wherein said signal is a multicarrier signal including a plurality of sub-carriers;
  means for determining a Gaussian noise power level in the signal, wherein the means for determining the Gaussian noise power level in the signal comprises:
    means for determining a total noise power level in the signal;
    means for determining a phase noise power level in the signal; and
    means for subtracting the phase noise power level from the total noise power level to determine the Gaussian noise power level in the signal;
  means for calculating a gain factor associated with the phase noise; and
  means for applying the gain factor to the Gaussian noise power level to calculate an equivalent noise power.

16. The apparatus of claim 15, wherein the phase noise power level of a first sub-carrier is based on an average power of a timing phase error in a phase error measurement sub-carrier and a ratio of a frequency of the first sub-carrier and a frequency of the phase error measurement sub-carrier.

17. The apparatus of claim 16, wherein the phase error measurement sub-carrier is a pilot-tone.

18. The apparatus of claim 16, wherein the gain factor, $G_P$, associated with a first sub-carrier is calculated as $$G_P = 1 + \frac{2}{\alpha \sigma} r_{\max} \frac{f}{f_p} \theta_{\max},$$

where $\alpha$ is a constant factor based on an error rate and a sub-carrier coding scheme, $\sigma^2$ is the Gaussian noise power level of the signal, $r_{max}$ is a maximum distance of an error constellation point from an origin, f is a frequency of the first sub-carrier, $f_P$ is a frequency of a phase error measurement sub-carrier, and $\theta_{max}$ is a maximum phase error.

19. An apparatus comprising:
  means for measuring phase noise in a signal, the phase noise due to a sampling-time phase mismatch between a transmitter device and a receiver device, wherein said signal is a multicarrier signal including a plurality of sub-carriers;
  means for determining a Gaussian noise power level in the signal;
  means for calculating a gain factor associated with the phase noise;
  activating phase noise compensation based on whether the gain factor is above a first threshold;
  deactivating phase noise compensation based on whether the gain factor is below a second threshold; and
  means for applying the gain factor to the Gaussian noise power level to calculate an equivalent noise power when phase noise compensation is activated.

20. A Digital Subscriber Line (DSL) modem comprising:
  a timing recovery module to measure a timing phase error within a signal, the timing phase error due to a sampling-time phase mismatch between a transmitter device and the DSL modem;
  a phase noise power module to determine a phase noise power level of the signal, the phase noise power level based on the timing phase error;
  a total noise power measurement module to measure a total noise power level of the signal, wherein a Gaussian noise power level of the signal is represented as the difference between the phase noise power level and the total noise power level; and
  a gain factor module to calculate a gain factor associated with the timing phase error and to apply the gain factor to the Gaussian noise power level in the signal to calculate an equivalent noise power.

21. The DSL modem of claim 20, further comprising:
  a signal power measurement module to measure a signal power level of the signal; and
  a signal-to-noise power module to determine a signal-to-noise ratio (SNR) based on the signal power level and the calculated equivalent noise power.

22. The DSL modem of claim 21, further comprising:
  a bit-loading module to determine bit-loading based on the signal-to-noise ratio.

23. The DSL modem of claim 22, wherein the signal is a multicarrier signal including a plurality of sub-carriers.

24. The DSL modem of claim 23, wherein the timing phase error is measured from a pilot-tone of the multicarrier signal.

25. The DSL modem of claim 23, wherein the gain factor, $G_P$, associated with a first sub-carrier is calculated as $$G_P = 1 + \frac{2}{\alpha \sigma^2} r_{max} \frac{f}{f_p} \theta_{max},$$

where $\alpha$ is a constant factor based on an error rate and a sub-carrier coding scheme, $\sigma^2$ is the Gaussian noise power level of Gaussian noise power level of the signal, $r_{max}$ is a maximum distance of an error constellation point from an origin, f is a frequency of the first sub-carrier, $f_p$ is a frequency of a phase error measurement sub-carrier, and $\theta_{max}$ is a maximum phase error.

26. The DSL modem of claim 20, wherein the gain factor module is further to activate phase noise compensation based on a first threshold and deactivate phase noise compensation based on a second threshold, wherein the first threshold is greater than the second threshold.

* * * * *